United States Patent Office 3,344,146
Patented Sept. 26, 1967

3,344,146
α-SUBSTITUTED 1-NAPHTHYL-ACETAMIDES AND NON-TOXIC ACID ADDITION SALTS THEREOF
Silvano Casadio, Milan, Italy, assignor to Istituto de Angeli S.p.A., Milan, Italy, a corporation of Italy
No Drawing. Filed May 4, 1964, Ser. No. 364,792
Claims priority, application Great Britain, May 14, 1963, 19,159/63
6 Claims. (Cl. 260—311)

This invention relates to new α-substituted 1-naphthyl-acetamides having valuable pharmacological properties.

According to the invention, there are provided new α-substituted 1-naphthyl-acetamides of the general formula

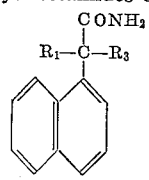

I in which $R_1$ represents the group

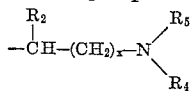

(in which $R_2$ represents hydrogen or an alkyl, aryl or aralkyl group; $R_4$ and $R_5$ which may be the same or different each represents an alkyl or aralkyl group or $R_4$ and $R_5$ together with the adjacent nitrogen atom represent a heterocyclic group which may contain a further hetero atom; and $x$ represents 0 or an integer from 1 to 6); and $R_3$ represents an alkyl, alkenyl, aryl or aralkyl group, or any group which may be represented by $R_1$; and nontoxic acid addition salts thereof.

We use the term "nontoxic" herein to designate salts formed with acids (either inorganic or organic) the anionic portions of which are physiologically compatible in the doses at which the salts are administered.

The new compounds according to the invention have valuable antiphlogistic, analgesic and/or antipyretic activity (and in addition may have diuretic activity) as explained in more detail hereinafter. It will be appreciated that not all the compounds according to the invention possess all the above-mentioned types of pharmacological activity; each compound according to the invention possesses one or more types of activity according to its chemical structure.

In compounds of the Formula I in which $R_2$, $R_3$, $R_4$ and/or $R_5$ represent alkyl groups, they preferably represent lower alkyl groups containing from 1 to 6 carbon atoms, e.g. methyl, ethyl, propyl, isopropyl, sec. butyl or hexyl groups. Where $R_2$ or $R_3$ represents an aryl group, it preferably represents a phenyl group whilst where $R_4$ or $R_5$ represents an aralkyl group it preferably represents a benzyl group. Where $R_4$ and $R_5$, together with the nitrogen atom to which they are bonded, represent a heterocyclic group, they preferably represent a saturated heterocyclic group such as, for instance, a morpholino or piperidino group. The heterocyclic group may if desired, as in the case of a morpholino group, contain a further hetero atom. The integer represented by $x$ is preferably a number from 1 to 4, especially 1 to 3. A particularly useful compound according to the invention is α-isopropyl-α-(2-dimethylaminoethyl)-1-naphthylacetamide.

Preferred nontoxic inorganic and organic acid addition salts include hydrochlorides, sulphates, hydrobromides, phosphates, acetates, propionates, succinates, tartrates, citrates, maleates, formates and cyclohexyl sulphamates. Furthermore, especially useful acid addition salts are salts of the α-substituted 1-naphthylacetamides with metamizole.

Metamizole itself is the sodium salt of 1-phenyl-2,3-dimethyl-pyrazolin-5-one - 4 - methylamino-methane sulphonic acid, and it will be appreciated that by "salts of the α-substituted 1-naphthylacetamides with metamizole" we mean salts containing the anionic portion of metamizole together with a cationic portion derived from the α-substituted 1-naphthylacetamide.

An outstanding useful compound according to the invention is α-isopropyl - α - (2-dimethylaminoethyl)-1-naphthylacetamide in the form of its acid addition salt with metamizole; such an acid addition salt has the formula

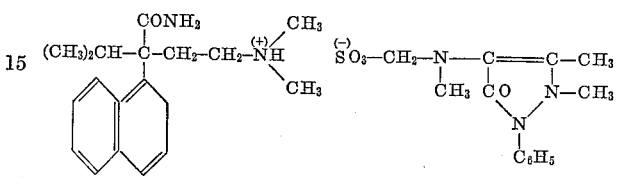

Metamizole itself possesses antiinflammatory antipyretic and analgesic actions, and therefore α-substituted-1-naphthylacetamides according to the invention in the form of acid addition salts with metamizole possess enhanced pharmacological activity as compared with the corresponding free bases of Formula I.

Other particularly useful compounds according to the invention, especially when in the form of acid addition salts with metamizole, are as follows:

α-sec.Butyl-α-(2-dimethylaminoethyl) - 1 - naphthylacetamide,

α-methyl-α-(1-phenyl-2-dimethylaminoethyl) - 1 - naphthylacetamide, and

α-isopropyl-α-(2-methylethylaminoethyl) - 1 - naphthylacetamide.

According to a further feature of the invention, there is provided a process for the preparation of the compounds of Formula I and their nontoxic acid addition salts which comprises hydrolysing a nitrile of the formula

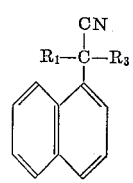

II in which $R_1$ and $R_3$ are as hereinbefore defined, in the presence of a mineral acid and a liquid carboxylic acid and, if desired, converting the compound of Formula I thus obtained to a nontoxic acid addition salt thereof.

In the acid hydrolysis according to the invention the reaction is preferably effected in the presence of a quantity of water in excess of the stoichiometric amount required for the hydrolysis. The mineral acid may, for example, be hydrochloric, hydrobromic, perchloric, phosphoric or, preferably, sulphuric acid. The liquid carboxylic acid may, for example, be a lower alkanoic acid such as acetic acid or propionic acid. A mixture of concentrated sulphuric acid and glacial acetic acid is especially effective. About equal proportions by volume of the mineral acid and liquid carboxylic acid are preferably used and, in a particularly convenient process, the quantities by volume of water and each of the two acids used for the hydrolysis are substantially equal. The hydrolysis is conveniently effected at elevated temperatures, advantageously at the reflux temperature of the reaction mixture. The reaction time varies according to the nitrile of Formula II used, the reaction temperature, etc., and is in general within the range of from 6 to 200 hours. Thus in one convenient method according to the invention, one part by weight of the nitrile of Formula II is refluxed, with vigorous stirring, with 4 parts by volume of a mixture of concentrated sulphuric acid, glacial acetic acid and water in the ratio of 1:1:1 by volume over a period of 6 to 200 hours. The reaction mixture is then cooled, diluted with water and made alkaline to phenolphthalein by the addition of alkali, e.g. 30% sodium hydroxide solution.

The compounds according to the invention may be separated from the reaction mixture obtained as a result of the above-described process by filtration (where the compound separates as a solid) or extraction with a suitable solvent such as, for example, ether, benzene or chloroform, followed by evaporation of the solvent (where the compound separates as a pasty or oily mass). The products thus obtained are in general conveniently purified by crystallisation, distillation or by formation of their acid addition salts.

The α-substituted 1-naphthyl-acetamides of Formula I are usually white crystalline solids which are practically insoluble in water but readily soluble in alcohol and aqueous solutions of acids, in the latter case with the formation of acid addition salts according to the invention. The acid addition salts may also be obtained by the addition, to a solution of the free base of Formula I in a suitable solvent, of the appropriate acid (if desired also in solution in a suitable solvent) followed by separation of the salt thus formed e.g. by filtration and recrystallisation. Suitable solvents for the free bases of Formula I include ether, benzene, methyl acetate and ethyl acetate. Acid addition salts of compounds of the Formula I may be converted to further acid addition salts in some instances by double decomposition with salts e.g. sodium salts of appropriate acids. The salts are in general white, crystalline solids which are readily soluble in water.

As stated above, acid addition salts of compounds of Formula I with metamizole are particularly preferred compounds according to the invention. These acid addition salts are conveniently prepared (a) by treating an equivalent of metamizole (in the form of the acid) with an equivalent of an α-substituted 1-naphthylacetamide of Formula I, or (b) by double decomposition between an equivalent of a further acid addition salt of an α-substituted 1-naphthylacetamide of Formula I and metamizole (sodium salt). The processes are conveniently effected in a suitable solvent such as, for example, water, ethanol or acetic acid. In one method, the preparation is effected by addition of an equivalent amount of a mineral acid to an equimolecular mixture of the α-substituted 1-naphthylacetamide and metamizole partly or completely dissolved in one of the above mentioned solvents. Preferred mineral acids for use in this method include, for example, sulphuric acid, hydrochloric acid and perchloric acid. The acid addition salt thereby obtained may be isolated as follows: The solvent is first removed, under vacuum, at a moderate temperature (30–50° C.), and the residue thereby obtained redissolved in a suitable solvent (for example acetone, methanol or chloroform). The inorganic salt is removed by filtration and the solution evaporated to dryness, under vacuum, again at moderate temperature. When the reaction is effected in water, the product may be isolated by extraction with chloroform and subsequent evaporation of the chloroform solution at reduced pressure.

An alternative method of preparing the metamizole acid addition salts comprises mixing, with vigorous stirring, equivalent quantities of an α-substituted 1-naphthylacetamide of Formula I and a solution of 1-phenyl-2,3-dimethylpyrazolin-5-one-4-methylaminomethane sulphonic acid obtained, for example, by treating an aqueous solution of metamizole with a strong cationic resin or by treating a methanolic solution of metamizole with sulphuric acid. The product is then isolated by removal of the solvent under vacuum at moderate temperature.

A further alternative method involves a double decomposition reaction between an acid addition salt of an α-substituted 1-naphthylacetamide of Formula I preferably the sulphate, and metamizole (sodium salt) in aqueous solution. The metamizole acid addition salt thus obtained may be purified by washing with a suitable solvent such as ether, ethyl acetate or by crystallization from a mixture of ethyl acetate:alcohol (6:1).

The preferred metamizole acid addition salt, namely that with α-isopropyl-α-(2-dimethylaminoethyl)-1-naphthylacetamide, is a white crystalline solid soluble in water, ethanol, methanol, acetone and glycol and practically insoluble in ether. In its stable form it contains 1 molecule of water of crystallisation which may be removed by heating in vacuo to 80° C. When exposed to the atmosphere, the anhydrous compound regains its water of recrystallisation. The anhydrous compound melts at 139–140° C. and the compound with its molecule of water of crystallisation at about 100° C.

It will be appreciated that the compounds of Formula I in which $R_1$ and $R_3$ do not represent the same group, and also the compounds of Formula I in which $R_2$ represents a group other than hydrogen, can exist in optically active and racemic forms and that all such forms of the compounds of Formula I are within the scope of the present invention.

The nitriles of Formula II used in the above-mentioned processes may be prepared by a method, described in co-pending application No. 323,259 filed Nov. 13, 1963, now abandoned, which comprises reacting an acetonitrile of the formula

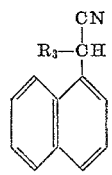

IV in which $R_3$ is as hereinbefore defined, with an amine of the formula $$R_1X \qquad V$$

in which X represents a halogen atom, preferably chlorine, in the presence of a condensation agent as catalyst. Suitable condensing agents include alkali metal amides such as sodamide, alkali metal hydrides and lithium phenyl.

An alternative method of preparing the nitriles of Formula II in which $R_3$ represents an alkyl group, which method is also described in co-pending application No. 323,259, comprises reacting an acetonitrile of the formula

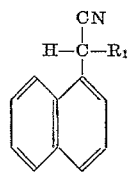

VI in which $R_1$ is as hereinbefore defined, with an alkyl halide in the presence of a condensing agent as catalyst. Again, suitable condensing agents are alkali metal amides such as sodamide, alkali metal hydrides and lithium phenyl.

As stated above, the compounds according to the invention possess antiphlogistic, analgesic and/or antipyretic activity and may in addition possess diuretic activity. The antiphlogistic action of certain of the compounds according to the invention is of especial importance, particularly as such compounds appear to cause little or no salt retention but on the contrary exhibit a clear diuretic action. This is in contrast to phenylbutazone and the glucocorticoides, which are known compounds having useful antiphlogistic actions which also, however, cause salt retention. The compound α-isopropyl-α-(2-dimethylaminoethyl)-1-naphthylacetamide possesses particularly valuable antiphlogistic analgesic and antipyretic activity as well as a fairly good diuretic activity; the compounds α-sec. butyl-α-(2-dimethylaminoethyl) - 1-naphthylacetamide, α-methyl-α-(1-phenyl - 2 - dimethylaminoethyl) - 1 - naphthylacetamide and α - isopropyl - α-(2-methylethylaminoethyl)-1-naphthylacetamide possess good antiphlogistic, analgesic and antipyretic activity as well as a slight diuretic activity. Furthermore, the compounds according to the invention in general have low toxicities.

Pharmacological tests have been carried out to illustrate the pharmacological activity of the compound α-isopropyl - α-(2-dimethylaminoethyl)-1-naphthylacetamide. The following is a summary of the results obtained:

Acute toxicity in mice $LD_{50}$ i.p. 263.6 mg./kg. (255.4–272.2), $LD_{50}$ p.o.s. 1086 mg./kg. (1021–1156).

Acute toxicity in rats $LD_{50}$ i.p. 269.1 mg./kg., $LD_{50}$ p.o.s. 1550 mg./kg.

Chronic toxicity

The product administered orally to young rats for a period of 6 months at a daily dose of 50 mg./kg. appears to cause no toxic effect on body growth, hematic crasis or on the main histologically studied organs.

Analgesic/antiinflammatory activity in rats—Randall and Selitto Test (Randall O. C., Selitto, J. J., Arch. Int. Pharmacodyn., 111, 409, 1957)
$ED_{50}$ i.p. 40.50 mg./kg. ($LD_{50}/ED_{50}=6.64$).
$ED_{50}$ p.o.s. 171.4 mg./kg. ($LD_{50}/ED_{50}=9.04$).

Analgesic activity in mice—"Hot-plate" test (Test described by Adami E, Marazzi-Uberti E., Arch. Int. Pharmacodyn., 107, 322, 1956)
$ED_{50}$ i.e. 100 mg./kg. ($LD_{50}/ED_{50}=2.64$).
$ED_{50}$ p.o.s. 167.7 mg./kg. ($LD_{50}/ED_{50}=6.47$).

Antiinflammatory activity (a) Formalin-induced oedema in rats (Wilhelmi G., Die Medizinische, 50, 1591, 1956)

| Dose: | Reduction of oedema, percent |
|---|---|
| 100 mg./kg. i.p. | 41 |
| 50 mg./kg. i.p. | 23 |
| 400 mg./kg. p.os | 46 |
| 300 mg./kg. p.os | 34 |
| 100 mg./kg. p.os | 20 |

(b) Kaolin-induced oedema in rats (Piccinini F., Marazzi-Uberti E., Lungaresi C., Arch. Int. Pharmacodyn., 132, 16, 1961)

| Dose: | Reduction of oedema, percent |
|---|---|
| 150 mg./kg. i.p. | 27 |
| 100 mg./kg. i.p. | 26 |
| 50 mg./kg. i.p. | 12 |
| 400 mg./kg. p.os | 39 |
| 300 mg./kg. p.os | 30 |
| 200 mg./kg. p.os | 22 |

(c) Granuloma from Croton oil in rats (Selye H., Proc. Exp. Biol. Med., 82, 328, 1953)
Dose 200 mg./kg./day p.os for 14 days, reduction of granuloma: 64%.
Dose 100 mg./kg./day p.os for 14 days, reduction of granuloma: 39%.

(d) Granuloma from Agar (Cressere A., Meli A., Arch. Sci. Biol., 37, 551, 1953)
Dose 200 mg./kg./day p.os for 6 days, reduction of granuloma: 76%.
Dose 100 mg./kg./day p.os for 6 days, reduction of granuloma: 51%.
Dose 50 mg./kg./day p.os for 6 days, reduction of granuloma: 36%.

Antipyretic activity in rats fevered with yeast (Smith P. F. and Hambourger W. E. J. Pharm. Exp. Ther., 54, 346, 1935)

| Dose: | Fall in temp. °C. |
|---|---|
| 200 mg./kg. p.os | 2.4 |
| 100 mg./kg. p.os | 1.8 |
| 50 mg./kg. p.os | 0.9 |

Diuretic activity

The product has a fairly good diuretic activity.

Further pharmacological tests have been carried out to illustrate the pharmacological activity of α-isopropyl-α-methylaminoethyl-1-naphthylacetamide in the form of its acid addition salt with metamizole. The followng is a summary of the results obtained:

Acute toxicity in mice $LD_{50}$ i.p. 510 mg./kg. $LD_{50}$ p.os 1685 mg./kg.

Acute toxicity in rats $LD_{50}$ i.p. 582 mg./kg. $LD_{50}$ p.os 3730 mg./kg.

Analgesic activity in mise—Phenylquinone-test (Hendershot L. C., Forsaith J., J. Pharmacol. Exp. Ther., 125, 237, 1959)
$ED_{50}$ subcutaneous, 71.6 mg./kg.

Analgesic activity in mice—"Hot plate" test $ED_{50}$ i.p. 170 mg./kg. ($LD_{50}/ED_{50}=3$).
$ED_{50}$ p.os 434 mg./kg. ($LD_{50}/ED_{50}=3.88$).

Analgesic antiinflammatory activity in rats—Randall and Selitto Test $ED_{50}$ i.p. 12,18 mg./kg. ($LD_{50}/ED_{50}=47.8$).
$ED_{50}$p.os 21,88 mg./kg. ($LD_{50}/ED_{50}=170.5$).

Antiinflammatory activity (a) Formalin-induced oedema in rats

| Dose: | Reduction of oedema, percent |
|---|---|
| 800 mg./kg. p.os | 51 |
| 800 mg./kg. p.os | 56 |
| 400 mg./kg. p.os | 45 |

(b) Kaolin-induced oedema in rats

Antipyretic activity in rats fevered with yeast

| Dose: | Fall in temp. °C. |
|---|---|
| 400 mg./kg. p.os | 3.8 |
| 200 mg./kg. p.os | 2.9 |
| 100 mg./kg. p.os | 2.2 |

The invention further provides pharmaceutical compositions comprising as active ingredients at least one of the compounds according to the invention in association with a pharmaceutical carrier or excipient. The compositions may be prepared in a form suitable for oral, parenteral, rectal or topical administration.

Thus, for example, compositions for oral administration may take the form of solid formulations, such as, for example, tablets, pills, capsules or dragees, suitable solid carriers including lactose, starches (particularly corn, maize and soluble starches) and magnesium stearate. The compositions for oral administration may also be in liquid form, for example in the form of elixirs, suspensions, emulsions, drop solutions, linctuses or syrups, suitable liquid carriers including water and sweetening, thickening, dispersing, flavouring and/or other agents. In the preparation of liquid forms of the composition, the compounds according to the invention are preferably used in the form of their soluble non-toxic acid addition salts.

Compositions for parenteral administration preferably consist of injectable solutions including, as carrier, sterile, pyrogen-free water or an oil e.g. arachis oil, if desired containing dispersing and other agents. Such compositions are conveniently contained in ampoules. Again, the compounds according to the invention are preferably in the form of their soluble, non-toxic, acid addition salts.

In compositions for rectal administration, the carrier is preferably a conventional suppository base such as, for example, a glyceride or cocoa butter.

In compositions for topical administration, the carrier will generally be a conventional ointment base.

The compositions are advantageously formulated as dosage units, each dosage unit being adapted to supply a single dose of the active ingredient. Each dosage unit may conveniently contain 0.01 to 1 g. and preferably 0.05 to 0.5 g. of the active ingredient. Examples of dosage unit form are tablets, capsules, dragees, pills, suppositories and ampoules containing solutions or dispersions for injection.

The following examples illustrate the preparation of α-substituted 1-naphthyl-acetamides and acid addition salts thereof according to the invention and also pharmaceutical compositions containing such compounds as active ingredients.

EXAMPLE 1

10 g. of α-methyl-α-(2-morpholinoethyl)-1-naphthyl-acetonitrile are refluxed for 24 hours with a mixture of 13 ml. of conc. sulphuric acid, 13 ml. of acetic acid and 13 ml. of water. After cooling, the mixture is diluted with water and made alkaline to phenolphthalein by the addition of 30% sodium hydroxide solution. The solid thereby precipitated is filtered, carefully washed with water, dried and finally crystallized from a mixture of ligroin/ethanol in a ratio of 10:1.

α-Methyl-α-(2 - morpholinoethyl)-1-naphthylacetamide is obtained as a white crystalline solid melting at 177–178° C.

*Analysis.*—For $C_{19}H_{24}N_2O_2$: Calculated, percent, C 73.04, H 7.74, N 8.97. Found: C 74.05, H 7.89, N 9.09.

The following α-substituted 1-naphthylacetamides are prepared by a closely analogous method:

(a) α-Isopropyl-α-(2-morpholinoethyl) - 1 - naphthyl-acetamide:

Hydrolysis time=96 hours; product crystallised from ligroin/ethanol (10:1); melting point=185–186° C.

*Analysis.*—For $C_{21}H_{28}N_2O_2$: Calculated, percent, C 74.08, H 8.29, N 8.23. Found: C 74.25, H 8.12, N 8.30.

(b) α,α-Di(2-morpholinoethyl)-1-naphthylacetamide:

Hydrolysis time=24 hours; product crystallised from water/ethanol (4:1); melting point=176–177° C.

*Analysis.*—For $C_{24}H_{33}N_3O_3$: Calculated, percent, C 70.04, H 8.08, N 10.21. Found: C 70.31, H 7.98, N 10.32.

EXAMPLE 2

10 g. of α-isopropyl-α-(2-dimethylaminoethyl)-1-naphthylacetonitrile are refluxed with a mixture of 13 ml. of conc. sulphuric acid, 13 ml. of acetic acid and 13 ml. water for a period of 144 hours with stirring. After cooling, the mixture is diluted with water and made alkaline to phenolphthalein by the addition of 30% sodium hydroxide solution. The sticky solid thereby precipitated is extracted with ether and the ethereal solution is carefully washed with water and dried over magnesium sulphate. The solvent is then distilled off under vacuo and the residue crystallised from ligroin.

The α-isopropyl-α-(2-dimethylaminoethyl)-1-naphthyl-acetamide thus obtained is a white crystalline solid melting at 116–117° C. After further recrystallization from ethanol/water (3:7), a purified product is obtained melting at 134° C.

*Analysis.*—For $C_{19}H_{26}N_2O$: Calculated, percent, C 76.47, H 8.78, N 9.39. Found: C 76.86, H 8.99, N 9.59.

The following α-substituted 1-naphthylacetamides are prepared by a closely analogous method:

(a) α-Methyl-α-(2 - dimethylaminoethyl)-1-naphthyl-acetamide:

Hydrolysis time=24 hours; product crystallised from ligroin; melting point=71.5–72.5° C.

*Analysis.*—For $C_{17}H_{22}N_2O$: Calculated, percent, C 75.52, H 8.20, N 10.36. Found: C 75.01, H 8.37, N 10.35.

(b) α,α-Di(2-dimethylaminoethyl) - 1 - naphthylacetamide:

Hydrolysis time=24 hours; product crystallised from ligroin/benzene (10:1); melting point=114–115° C.

*Analysis.*—For $C_{20}H_{29}N_3O$: Calculated, percent, C 73.35, H 8.93, N 12.83. Found: C 73.72, H 9.06, N 12.95.

(c) α-Ethyl-α-(2 - morpholinoethyl)-1-naphthylacetamide:

Hydrolysis time=24 hours; product crystallised from ligroin/ethanol (20:1); melting point=153–154° C.

*Analysis.*—For $C_{20}H_{26}N_2O_2$: Calculated, percent, C 73.59, H 8.03, N 8.58. Found: C 73.89, H 8.14, N 8.63.

(d) α-Sec. butyl-α-(2 - morpholinoethyl)-1-naphthyl-acetamide:

Hydrolysis time=96 hours; product crystallised from ligroin/ethanol (15:1); melting point=163–164° C.

*Analysis.*—For $C_{22}H_{30}N_2O_2$: Calculated, percent, C 74.54, H 8.53, N 7.90. Found: C 74.82, H 8.38, N 7.83.

(e) α-Methyl - α - (2-piperidinoethyl)-1-naphthylacet-amide:

Hydrolysis time=24 hours, product crystallised from ligroin. Melting point=136–137° C.

*Analysis.*—For $C_{20}H_{26}O$: Calculated, percent, C 77.38, H 8.44, N 9.03. Found: C 77.02, H 8.55, N 9.22.

(f) α-Sec. butyl - α-(2-piperidinoethyl)-naphthylacet-amide:

Hydrolysis time=96 hours, product crystallised from ether. Melting point=164–165° C.

*Analysis.*—For $C_{23}H_{32}N_2O$: Calculated, percent, C 78.36, H 9.15, N 7.95. Found: C 77.92, H 9.01, N 8.18.

(g) α,α-Di(2-piperidinoethyl)-1-naphthylacetamide:

Hydrolysis time=24 hours, product crystallised from ligroin. Melting point=159–160° C.

*Analysis.*—For $C_{26}H_{37}N_3O$: Calculated, percent, C 76.61, H 9.15, N 10.31. Found: C 76.05, H 9.22, N 10.52.

EXAMPLE 3

10 g of α-ethyl-α-(-piperidinoethyl)-1-naphthyl-acetonitrile are hydrolysed by a method analogous to that described in Example 2, refluxing being continued for a period of 24 hours. Upon making the reaction solution alkaline to phenolphthalein by the addition of 30% sodium hydroxide an oil separates which is then extracted with ether. The ethereal solution is carefully washed with water, dried over magnesium sulphate and evaporated to dryness. The residue is distilled under reduced pressure and the fraction boiling at 196–198° C. 0.1 mm. Hg collected. The α-ethyl-α-(2-piperidinoethyl)-1-naphthyl-acetamide thus obtained is a white crystalline solid melting, after crystallization from ethanol-water (1:1) at 106.5–107.5° C.

*Analysis.*—For $C_{21}H_{28}N_2O$: Calculated, percent, C 77.73, H 8.70, N 8.63. Found: C 77.23, H 8.45, N 8.65.

The following α-substituted 1-naphthylacetamides are prepared by a closely analogous method:

(a) α - Sec. butyl - α-(2-dimethylaminoethyl)-1-naphthylacetamide:

Hydrolysis time=144 hours; boiling point=185–187° C/0.2 mm. Hg; product crystallised from petroleum ether; melting pt.=92–93° C.

*Analysis.*—For $C_{20}H_{28}N_2O$: Calculated, percent, C 76.88, H 9.03, N 8.97. Found: C 77.02, H 8.89, N 9.13.

(b) α - Isopropyl-α-(2-piperidinoethyl) - 1 - naphthyl-acetamide:

Hydrolysis time=96 hours; boiling point=202–204° C/0.5 mm. Hg; product crystallised from ether; melting point=117–118° C.

*Analysis.*—For $C_{22}H_{30}N_2O$: Calculated, percent, C 78.06, H 8.93, N 8.28. Found: C 78.19, H 8.81, N 8.49.

(c) α - Isopropyl-(3-dimethylaminopropyl)-1-naphthylacetamide:

Hydrolysis time=144 hours; boiling point=177–179° C/0.1 mm. Hg; glassy solid having a melting point =56–58° C.

*Analysis.*—For $C_{20}H_{28}N_2O$: Calculated, percent, C 76.88, H 9.03, N 8.97. Found: C 77.13, H 9.20, N 8.91.

(d) α - Isopropyl-α-(2-diethylaminoethyl)-1-naphthylacetamide:

Hydrolysis time=120 hours; boiling point=180–182° C/0.1 mm. Hg; glassy solid having a melting point =55–57° C.

*Analysis.*—For $C_{21}H_{30}N_2O$: Calculated, percent, C 77.25, H 9.26, N 8.58. Found: C 77.54, H 9.44, N 8.74.

EXAMPLE 4

10 g. of α-methyl-α-(1-phenyl-2-dimethylaminoethyl)-1-naphthylacetonitrile are hydrolysed by a method analogous to that described in Example 2, refluxing being continued for 24 hours. The crude product obtained after removal of the solvent is washed with a little ether and crystallised from ethanol/water (3:2). The α-methyl-α-(1 - phenyl - 2-dimethylaminoethyl)-1-naphthylacetamide so obtained is a white solid melting at 218–219° C.

*Analysis.*—For $C_{23}H_{26}N_2O$: Calculated, percent, C 79.73, H 7.56, N 8.09. Found: C 81.55, H 7.74, N 8.29.

EXAMPLE 5

10 g. of α-ethyl-α-(2-dimethylaminoethyl)-1-naphthylacetonitrile are hydrolysed by heating with a mixture of 13 ml. of conc. sulphuric acid, 13 ml. of acetic acid and 13 ml. of water under reflux for 24 hours. After cooling, the reaction mixture is diluted with water and made alkaline to phenol-phthalein by the addition of 30% sodium hydroxide solution. The product thereby precipitated in extracted with ether and the ethereal extract is carefully washed with water and dried over magnesium sulphate. The solvent is then distilled off and the residue is fractioned at reduced pressure. The α-ethyl-α-(2-dimethylaminoethyl)-1-naphthylacetamide is collected at 181–182° C/0.4 mm. Hg and is a glassy solid melting at 56–63° C. The product is redissolved in ether and dry hydrogen chloride is bubbled through the solution. The α-ethyl-α-(2 - dimethylaminoethyl)-1-naphthylacetamide hydrochloride precipitates as a white crystalline solid melting, after crystallisation from dry ethanol, at 246–347° C.

*Analysis.*—For $C_{18}H_{25}N_2O$ Cl: Calculated, percent, C 67.37, H 7.85, N 8.73. Found: C 67.92, H 7.76, N 8.97.

EXAMPLE 6

A solution consisting of 0.165 g. of maleic acid dissolved in 100 ml. of ether is added dropwise and with stirring to 0.5 g. of α-sec. butyl-α-(2-morpholinoethyl)-1-naphthylacetamide, dissolved in 300 ml. of ether. The precipitated salt is filtered and crystallised from dry ethanol. The α-sec. butyl-α-(2-morpholinoethyl)-1-naphthylacetamide maleate thus obtained is a crystalline solid melting at 200–201° C.

*Analysis.*—For $C_{26}H_{34}N_2O_6$: Calculated, percent, C 66.36, H 7.28, N 5.95. Found: C 66.50, H 7.12, N 6.05.

EXAMPLE 7

The following compounds are prepared by a method analogous to that described in Example 3:

α-Isopropyl-α-(2-methylethylaminoethyl) - 1 - naphthylacetamide: Hydrolysis time: 120 hours; boiling point: 188–190° C./0.1 mm. Hg.

*Analysis.*—For $C_{20}H_{28}ON_2$, Calculated, percent, C 76.88, H 9.03, H 8.97. Found: C 78.02, H 8.99, N 8.79.

α-Isopropyl-α-(2-benzylmethylaminoethyl) - 1 - naphthylacetamide: Hydrolysis time: 72 hours; boiling point: 203–205° C./0.1 mm. Hg.

*Analysis.*—For $C_{25}H_{30}ON_2$: Calculated, percent, C 80.17, H 8.07, N 7.48. Found: C 80.34, H 7.67, N 7.14.

EXAMPLE 8

*Preparation of tablets*

Suitable ingredients for the preparation of 1,000 tablets are as follows:

|  | G. |
|---|---|
| α-Isopropyl-α-(2 - dimethylaminoethyl - 1 - naphthylacetamide | 400 |
| Lactose | 125 |
| Corn starch | 21 |
| Magnesium stearate | 4 |

*Method of preparation*

The active substance, the excipients and one half of the magnesium stearate are intimately mixed; the mixture is compressed into pellets which are then granulated. The remaining magnesium stearate is added to the granulate, which is then compressed into tablets weighing 0.550 g. each. Each tablet contains 0.400 g. of active substance.

EXAMPLE 9

*Preparation of capsules*

Suitable ingredients for the preparation of 1,000 capsules are as follows:

|  | G. |
|---|---|
| α-sec. butyl- α -(2-dimethylaminoethyl)-1-naphthylacetamide | 200 |
| Corn starch | 47 |
| Talcum powder | 3 |

*Method of preparation*

The ingredients are intimately mixed and pulverized. The mixture is filled into hard gelatine capsules (0.25 g. per capsule); each capsule therefore contains 0.2 g. of active substance.

EXAMPLE 10

*Preparation of dragees*

Suitable ingredients for the preparation of 1,000 dragees are as follows:

|  | G. |
|---|---|
| α-methyl - α - (1-phenyl-2-dimethylaminoethyl)-1-naphthylacetamide | 200 |
| Lactose | 75 |
| Corn starch | 22 |
| Magnesium stearate | 3 |
| Sucrose | 300 |
| Gum-arabic, colouring agent, distilled water | q.s. |

*Method of preparation*

The active substance, lactose, corn starch and magnesium stearate are mixed to give a homogeneous mass which is compressed into bevelled tablets each weighing 0.3 g. The tablets are coated with sugar syrup and gum-arabic up to a weight of 0.6 g. per dragee. Each dragee contains 0.2 g. of active substance.

EXAMPLE 11

*Preparation of a syrup*

Suitable ingredients for the preparation of 1,000 ml. of syrup are as follows:

| α-Isopropyl - α-(2-dimethylaminoethyl)-1-naphthylacetamide hydrochloride | 15 g. |
|---|---|
| Methyl-p-hydroxybenzoate | 1.8 g. |
| Sucrose syrup at 50% p./v. | q.s. for 1 litre. |
| Colouring and flavouring agents | q.s. |

11
Method of preparation

The methyl-p-hydroxybenzoate and sucrose are dissolved, at a moderate temperature, in almost the whole quantity of the water necessary for the preparation of the syrup. The temperature is allowed to fall to room temperature. The active substance, flavouring and colouring agents are then added and the mixture made up to the required volume with distilled water. Each tablespoonful of the mixture contains about 0.2 g. of active substance.

EXAMPLE 12

Preparation of drop solution

Suitable ingredients for the preparation of 1,000 mls. of a drop solution are as follows:

| | |
|---|---|
| α-Sec. butyl-α - (2-dimethylaminoethyl)-1-naphthylacetamide hydrochloride | 100 g. |
| Methyl-p-hydroxybenzoate | 1.8 g. |
| Colouring and flavouring agents | q.s. |
| Distilled water | q.s. for 1 litre. |

Method of preparation

The active substance is dissolved, at room temperature, in 9/10 of the necessary water in which the methyl-p-hydroxybenzoate has previously been dissolved at a temperature of 80° C.; the flavouring and colouring agents are added and the solution brought up to the required volume. 20 drops of the solution contain 0.100 g. of active substance.

EXAMPLE 13

Preparation of suppositories

Suitable ingredients for the preparation of 1,000 suppositories are as follows:

| | G. |
|---|---|
| α - Isopropyl - α - (2-dimethylaminoethyl)-1-naphthylacetamide | 400 |
| Cocoa butter | 1800 |

Method of preparation

The active substance is well pulverised and is incorporated into the cocoa butter previously melted at 35° C.; the mixture is then well stirred to give a homogeneous mass which is filled into cold moulds to produce suppositories each of which weighs 2.2 g. Each suppository contains 0.4 g. of active substance.

EXAMPLE 14

Preparation of suppositories

Suitable ingredients for the preparation of 1,000 suppositories are as follows:

| | G. |
|---|---|
| α - Isopropyl - α - (2-dimethylaminoethyl)-1-naphthylacetamide | 400 |
| Water-soluble polyglycol excipient (M.P. 48° C.) | 2000 |

Method of Preparation

The polyglycol excipient is melted at a temperature of 50° C., and the active substance is dispersed in it; the mass obtained is filled into cold moulds to produce suppositories each of which weighs 2.4 g. Each suppository contains 0.4 g. of active substance.

EXAMPLE 15

Preparation of injectable solution

Suitable ingredients for the preparation of 1,000 ml. of injectable solution are as follows:

| | |
|---|---|
| α - Isopropyl - α - (2-dimethylaminoethyl) - 1-naphthylacetamide hydrochloride | 100 g. |
| Distilled pyrogen-free water | q.s. for 1000 ml. |

12
Method of preparation

A solution of the active ingredient in the distilled water is filtered through a sintered glass filter and then filled into vials of 1 ml. or 2 ml. volume. The vials are sterilized at 120° C. for 20 minutes. Each vial contains 100 or 200 mg. respectively, of active substance.

EXAMPLE 16

Preparation of injectable solutions

Suitable ingredients for the preparation of 1,000 ml. of injectionable solution are as follows:

| | |
|---|---|
| α - Methyl - α - (1-phenyl-2-dimethylaminoethyl) - 1-naphthylacetamide hydrochloride | 100 g. |
| Distilled pyrogen free water | q.s. for 1000 ml. |

Method of preparation

As described in Example 15.

EXAMPLE 17

Preparation of ointment

Suitable ingredients for the preparation of 1 kg. of ointment are as follows:

| | |
|---|---|
| α - Isopropyl - α - (2-dimethylaminoethyl)-1-naphthylacetamide | 100 g. |
| Zinc stearate | 100 g. |
| Ointment of polyglycols USP XV | q.s. for 1 kg. |

Method of preparation

The polyglycol ointment is melted at 65° C. and the active substance added. The temperature is allowed to drop to room temperature whilst the mixture is continuously stirred. Each gram of ointment contains 0.1 g. of active substance.

EXAMPLE 18

Preparation of ointment

Suitable ingredients for the preparation of 1 kg. of ointment are as follows:

| | |
|---|---|
| α-Sec.butyl-α-(2-dimethylaminoethyl)-1-naphthylacetamide | 100 g. |
| Ointment of polyglycols USP XV | q.s. for 1 kg. |

Method of preparation

As described in Example 17.

It will be appreciated that the compositions described in Examples 8–18 can if desired be modified by the addition of further therapeutic agents.

EXAMPLE 19

351 g. (1 mole) of sodium 1 - phenyl-2,3-dimethylpyrazolin-5-one-4 - methylaminomethane sulphonate dissolved in 1 litre of methanol are added to a solution of 298 g. (1 mole) of α-isopropyl-α-(2-dimethylaminoethyl)-1-naphthylacetamide in 600 ml. of methanol. The solution thus obtained is decolourised with carbon, filtered and then 200 ml. of 5 N sulphuric acid (1 equivalent) are added with vigorous stirring. The mixture is separated by filtration from the sodium sulphate formed during the reaction and the solvent completely removed by distillation at reduced pressure and at a temperature not above 50° C. The residue is redissolved in 3 litres of acetone in order to separate the small quantity of sodium sulphate still remaining. The mixture is filtered and the solvent again removed by evaporation under the same conditions as described above. The residue is repeatedly washed with ether and then dried for 12 to 50 hours at reduced pressure yielding the 1-phenyl-2,3-dimethylpyrazolin-5-one-4-methylaminomethanesulphonate salt of α-isopropyl-α-(2-dimethylaminoethyl)-1-naphthylacetamide in the form of its monohydrate. After crystallization from ethyl acetate/ethanol (6:1) the salt is obtained as a colourless crystalline solid melting, after drying at 80° C. at reduced pressure to constant weight, at 139–140° C. (anhydrous compound).

*Analysis.*—For C$_{32}$H$_{43}$N$_5$O$_5$S: Calculated, percent, C, 63.03, H, 7.11, N, 11.49. Found: C, 62.81, H, 7.12, N, 11.50.

EXAMPLE 20

29.8 g. (0.1 mole) of α-isopropyl-α-(2-dimethylaminoethyl)-1-naphthylacetamide are added to a solution of 35.1 g. (0.1 mole) of sodium 1-phenyl-2,3,-dimethyl-pyrazolin-5 - one - 4 - methylaminomethanesulphonate in 100 ml. of water and 20 ml. of sulphuric acid 5 N (0.1 equivalent) are then added with vigorous stirring. A clear solution is obtained which is extracted with 1 litre of chloroform divided into 5 portions. The chloroform solution is dried over sodium sulphate and the solvent then removed at reduced pressure. The solid residue is carefully washed with ether and dried to yield a product identical to that obtained in Example 19.

EXAMPLE 21

50 ml. of a 1 N solution of perchloric acid in acetic acid are added, with stirring, to a solution containing 17.5 g. (0.05 mole) of sodium 1-phenyl-2,3-dimethyl-pyrazolin-5-one - 4 - methylaminomethane sulphonate and 14.9 g. (0.05 mole) of α-isopropyl-α-(2-dimethylaminoethyl)-1-naphthylacetamide in 200 ml. of acetic acid. The solvent is distilled off at reduced pressure and a temperature of 50° C., and the viscous residue remaining is redissolved in acetone and the mixture filtered. The solution obtained is evaporated to dryness at reduced pressure and the residue purified by washing with ether to yield a product identical to that obtained in Example 19.

EXAMPLE 22

20 ml. of 5 N sulphuric acid are added to a solution of 35.1 g. (0.1 mole) of sodium 1-phenyl-2,3-dimethyl-pyrazolin-5-one - 4 - methylaminomethane sulphonate in 120 ml. of methanol. The sodium sulphate formed during the reaction is removed by filtration and the solution evaporated to dryness at reduced pressure. The residue is redissolved in methanol, separated from the small quantity of sodium sulphate remaining by filtration and the solvent distilled off in vacuo. The solid residue, consisting of 1-phenyl-2,3-dimethyl-pyrazolin-5-one-4-methylaminomethane sulphonic acid, is redissolved in 100 ml. of water and 29.8 g. (0.1 mole) of α-isopropyl-α-(2-dimethylaminoethyl)-1-naphthylacetamide added with stirring. The solution is decolourised with carbon and filtered, and the solvent is then distilled off at reduced pressure and at a temperature of 50° C. The residue is washed with ether and dried. A compound identical to that obtained in Example 19 is thus obtained.

EXAMPLE 23

A 30% aqueous solution of sodium 1-phenyl-2,3-dimethyl - pyrazolin-5-one-4-methylaminomethane sulphonate is passed through 200 ml. of a polystyrene sulphonic ion-exchange resin in a chromatographic column. When the pH of the eluted liquid has decreased to 2–3, the acid eluent is collected and elution continued until a flame-test reveals the presence of traces of sodium in the liquid. The solution thus obtained is treated with a slight excess of α-isopropyl-α-(2 - dimethylaminoethyl)1 - naphthyl-acetamide; then the solution is carefully washed with ether and the aqueous layer evaporated to dryness at reduced pressure at 50° C. A compound identical to that obtained in Example 19 is obtained.

EXAMPLE 24

34.6 g. (0.05 mole) of α-isopropyl-α-(2-dimethylaminoethyl)-1-naphthylacetamide sulphate are added to a solution of 35.1 g. (0.1 mole) of sodium 1-phenyl-2,3-dimethyl - pyrazolin-5-one 4-methylaminomethane sulphonate in 200 ml. of water. The solution thereby obtained is washed with ether and the aqueous layer evaporated to dryness at reduced pressure. The residue is treated with methanol, the sodium sulphate formed during the reaction removed by filtration and the solution evaporated to dryness at reduced pressure. A compound identical to that obtained in Example 19 is obtained.

EXAMPLE 25

*Preparation of tablets*

Suitable ingredients for the preparation of 1,000 tablets are as follows:

| | G. |
|---|---|
| α-Isopropyl-α-dimethylaminoethyl-1 - naphthylacetamide 1-phenyl-2,3 - dimethyl-pyrazolin - 5 - one 4-methylaminomethane sulphonate | 400 |
| Lactose | 125 |
| Corn starch | 21 |
| Magnesium stearate | 4 |

*Method of preparation*

The active compound, the excipients and one half of the magnesium stearate are intimately mixed; the mixture is compressed into pellets which are then granulated. The remaining magnesium stearate is added to the granulate which is then compressed into tablets each weighing 0.55 g. Each tablet contains 0.4 g. of active substance.

EXAMPLE 26

*Preparation of capsules*

Suitable ingredients for the preparation of 1,000 capsules are as follows:

| | G. |
|---|---|
| α-Isopropyl-α-(2-dimethylaminoethyl) - 1 - naphthyl-acetamide 1-phenyl-2,3 - dimethyl-pyrazolin-5-one 4-methylaminomethane sulphonate | 400 |
| Corn starch | 95 |
| Talc | 5 |

*Method of preparation*

The ingredients are intimately mixed and pulverised. Each capsule is filled with 0.5 g. of the homogeneous mixture thereby obtained. Each capsule contains 0.4 g. of active compound.

EXAMPLE 27

*Preparation of dragees*

Suitable ingredients for the preparation of 1,000 dragees are as follows:

| | |
|---|---|
| α-Isopropyl-α-(2-dimethylaminoethyl) - 1 - naphthyl-acetamide 1 - phenyl-2,3-dimethyl-pyrazolin-5-one 4-methylaminomethane sulphonate g__ | 300 |
| Lactose g__ | 75 |
| Corn starch g__ | 22 |
| Magnesium stearate g__ | 3 |
| Sugar g__ | 300 |
| Gum-arabic, colour, distilled water | q.s. |

*Method of preparation*

Convex tablets weighing 0.4 g. are prepared by the technique described in Example 25. The tablets are coated with sugar syrup, gum-arabic and a colouring agent up to a weight of 0.7 g. per dragee. Each dragee contains 0.3 g. of active substance.

EXAMPLE 28

*Preparation of a syrup*

Suitable ingredients for the preparation of 1,000 ml. of syrup are as follows:

| | |
|---|---|
| α - Isopropyl - α - (2 - dimethylaminoethyl-1-naphthylacetamide 1 - phenyl-2,3-dimethyl-pyrazolin-5-one-4-methylaminomethane sulphonate | 50 g. |
| Methyl-p-hydroxybenzoate | 1.8 g. |
| Sugar-syrup at 50% p./v. | q.s. for 1 litre. |
| Colouring and flavouring agents | q.s. |

Method of preparation

The methyl-p-hydroxybenzoate and sugar are dissolved by heating in the quantity of water necessary to prepare the syrup. The solution is allowed to cool to room temperature and then the active substance and the colouring and flavouring agents are added. When complete dissolution is achieved, the solution is made up to the required volume with distilled water. Each tea-spoon (5 ml.) of the syrup contains 0.25 g. of active compound.

EXAMPLE 29

Preparation of suppositories

Suitable ingredients for the preparation of 1,000 suppositories are as follows:

|  | G. |
|---|---|
| α-Isopropyl-α-(2-dimethylaminoethyl)-1 - naphthyl-acetamide 1-phenyl-2,3-dimethyl-pyrazolin-5-one-4-methylaminomethane sulphonate | 500 |
| Water soluble polyglycol excipient (M.P. 48° C.) or cocoa butter | 2000 |

Method of preparation

The active substance is incorporated into the melted excipient, and the homogeneous mixture thereby obtained is poured into cooled moulds. Each suppository contains 0.4 g. of active substance.

EXAMPLE 30

Preparation of injectable solutions

Suitable ingredients for the preparation of 1000 vials (each of 3 cc.) are as follows:

| α - Isopropyl - α - (2 - dimethylaminoethyl)-1-naphthylacetamide 1 - phenyl-2,3-dimethyl-pyrazolin-5-one 4-methylaminomethane sulphonate | 300 g. |
|---|---|
| Pyrogen-free distilled water | q.s. to 3 litres. |

Method of preparation

The active substance is dissolved in distilled water and the solution filtered through a sintered glass filter. The solution is then made up to the required volume and filled into 3 cc. vials. Each vial contains 0.3 g. of active substance.

I claim:

1. A compound as claimed in claim 6 which is a metamizole acid addition salt.

2. A compound selected from the group consisting of α-isopropyl-α-(2-dimethylaminoethyl)-1 - naphthylacetamide and the metamizole acid addition salt thereof.

3. A compound selected from the group consisting of α-sec.butyl-α-(2-dimethylaminoethyl) - 1 - naphthylacetamide and the metamizole acid addition salt thereof.

4. A compound selected from the group consisting of α-methyl-α-(1-phenyl-2-dimethylaminoethyl)-1 - naphthyl-acetamide and the metamizole acid addition salt thereof.

5. A compound selected from the group consisting of α-isopropyl-α-(2 - methylethylaminoethyl) - 1 - naphthyl-acetamide and the metamizole acid addition salt thereof.

6. A compound selected from the group consisting of a compound of the formula

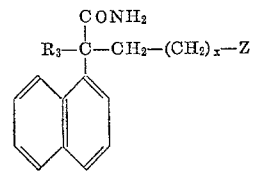

and a non-toxic acid addition salt thereof, wherein Z is a member selected from the group consisting of piperidino, morpholino and

wherein $R_4$ and $R_5$ are selected from the group consisting of methyl and ethyl, $x$ represents 1 or 2 and $R_3$ is selected from the group consisting of alkyl of from 1 to 4 carbon atoms and —$CH_2$—$(CH_2)_x$—Z, wherein Z and $x$ have the same meaning as above defined.

References Cited

FOREIGN PATENTS 796,839    6/1958    Great Britain.

OTHER REFERENCES

Casadio et al., Chemical Abstracts vol. 59, pages 1549–1550 (1963), effective date of abstract is 1962.

Martensson et al., A.C.T.A. Chem. Scand. vol. 14, pages 1136–1137 (1960).

ALEX MAZEL, *Primary Examiner.*

NICHOLAS S. RIZZO, *Examiner.*

J. TOVAR, *Assistant Examiner.*